United States Patent [19]

Fisher

[11] 4,030,633

[45] June 21, 1977

[54] SYSTEM FOR CONTROLLING SEGREGATION WITHIN A BIN DURING MATERIAL WITHDRAWAL

[75] Inventor: Glen W. Fisher, Seattle, Wash.

[73] Assignee: Technovators, Inc., Seattle, Wash.

[22] Filed: Aug. 29, 1975

[21] Appl. No.: 609,801

Related U.S. Application Data

[63] Continuation of Ser. No. 449,055, March 7, 1974, abandoned, which is a continuation of Ser. No. 354,173, April 25, 1973, abandoned, which is a continuation-in-part of Ser. No. 254,883, May 19, 1972, abandoned.

[52] U.S. Cl. .................................... 222/1; 222/145; 222/462; 222/564

[51] Int. Cl.$^2$ .......................................... B65G 65/30

[58] Field of Search ........................... 222/460–462, 222/478, 479, 488, 145, 1, 564; 259/4, 180

[56] References Cited

UNITED STATES PATENTS

| | | | |
|---|---|---|---|
| 947,507 | 1/1910 | Westerbeck | 222/461 X |
| 3,158,362 | 11/1964 | Seifarth | 259/180 |
| 3,273,864 | 9/1966 | Thomson | 259/97 |
| 3,386,707 | 6/1968 | Brown | 259/180 X |
| 3,575,321 | 4/1971 | Fisher | 259/180 |

*Primary Examiner*—Robert B. Reeves
*Assistant Examiner*—John P. Shannon
*Attorney, Agent, or Firm*—Dowrey and Cross

[57] ABSTRACT

The system includes a plurality of material discharge spouts combined with a blending device for use with a hoppered bin. Each spout opens to the hopper at a location selected to draw material into the hopper from substantially one predetermined portion of a horizontal bin cross sectional plane in a first in — first out segregation free manner. The blending device combines the material discharge streams formed by the spouts in proportion to the areas of the portions of the horizontal bin cross sectional plane from which they are drawn, respectively, to form a common discharge stream of uniform composition. The principles of the invention are applicable to conversion of existing bins or bin bottoms, or to a bin withdrawal system or process. Also disclosed is a blending unit which includes a mass flow hopper, the blending unit being particularly suited for bin or bin bottom conversion application.

23 Claims, 29 Drawing Figures

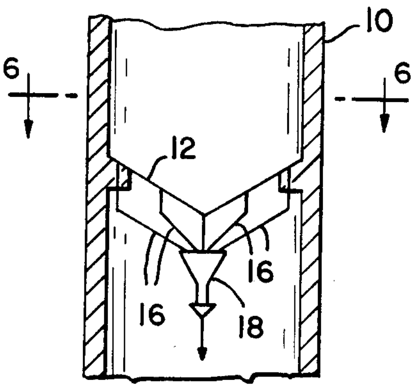
FIG. 3
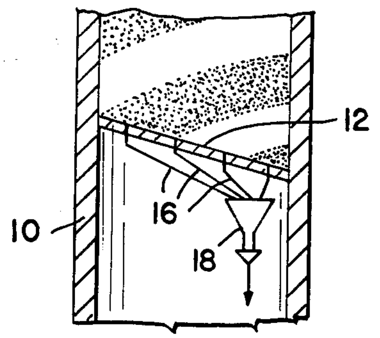
FIG. 4
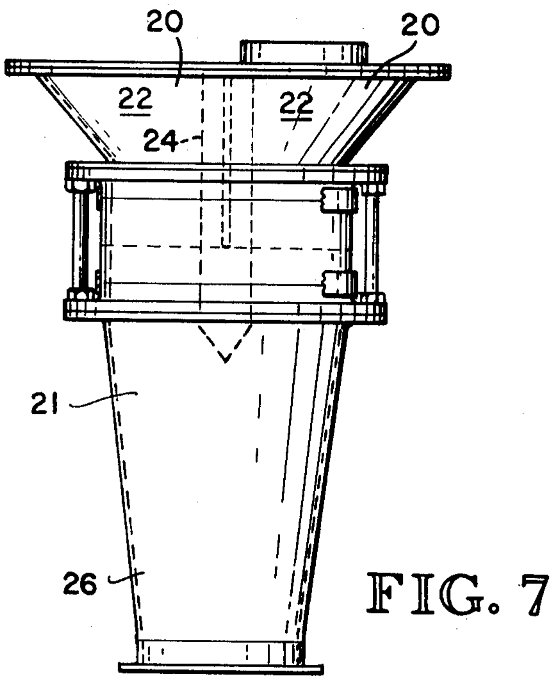
FIG. 7
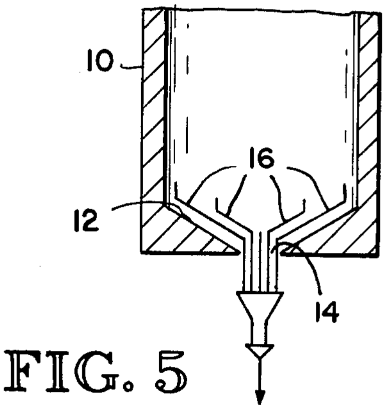
FIG. 5
FIG. 6
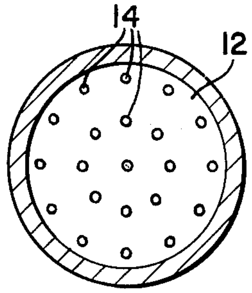

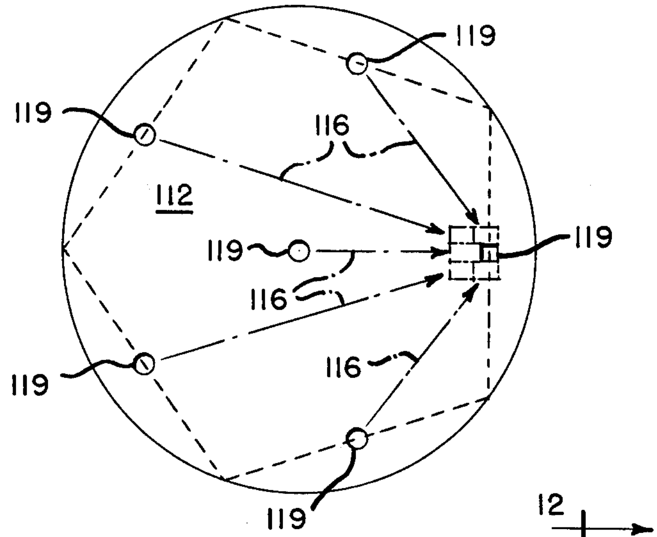
FIG. 10
FIG. 11
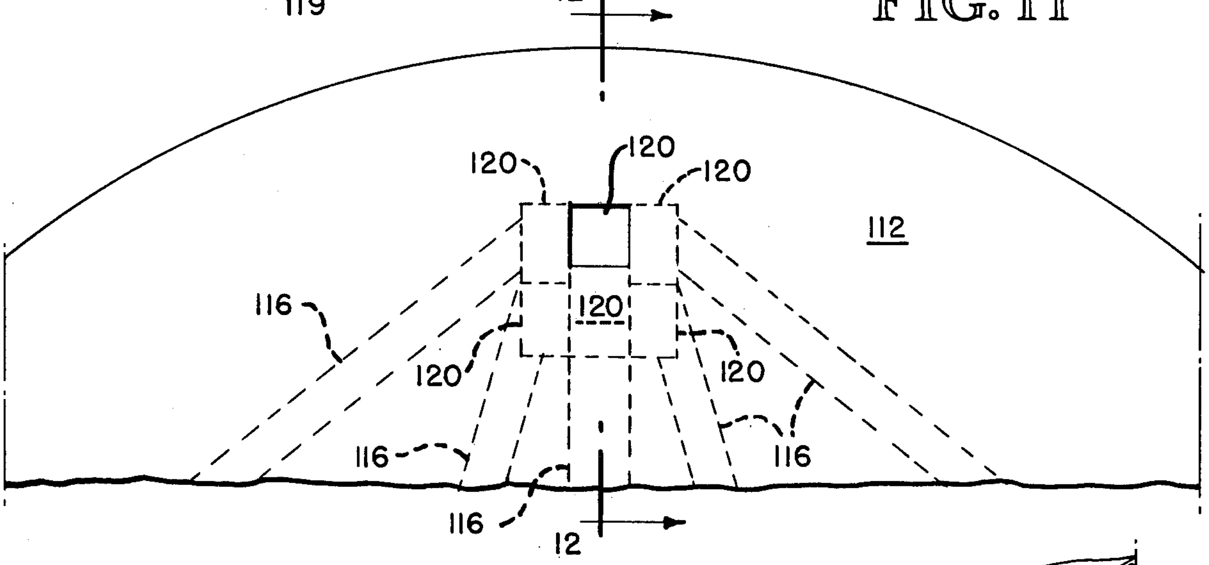
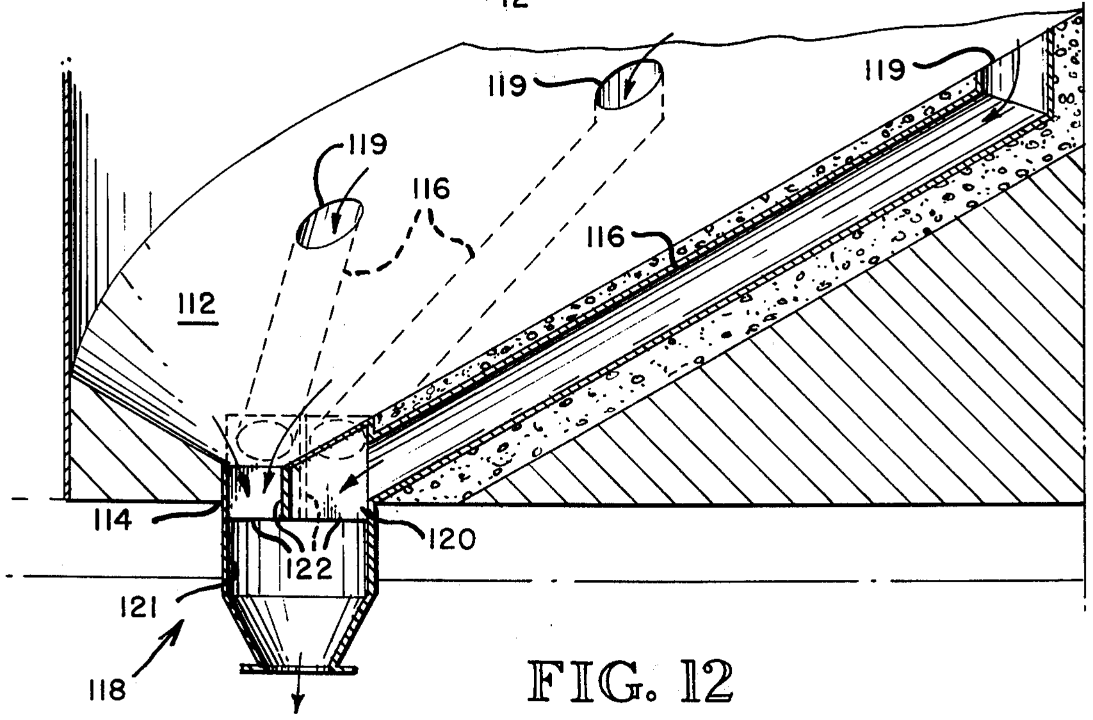
FIG. 12

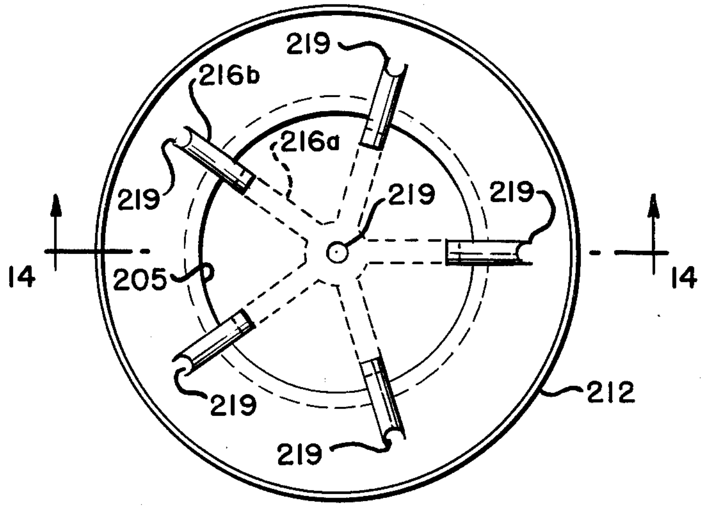
FIG. 13
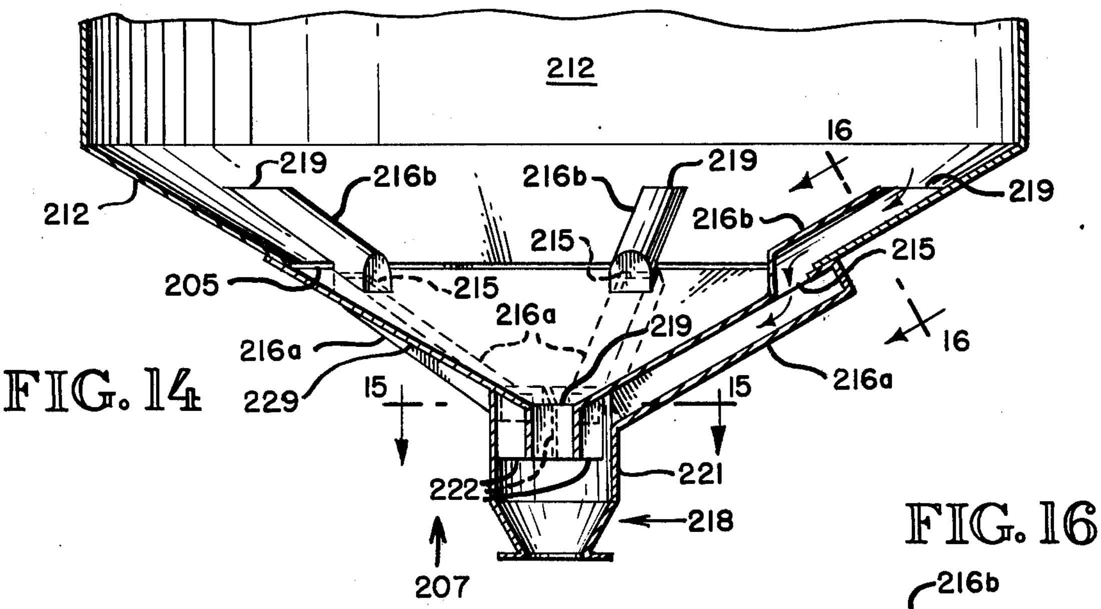
FIG. 14
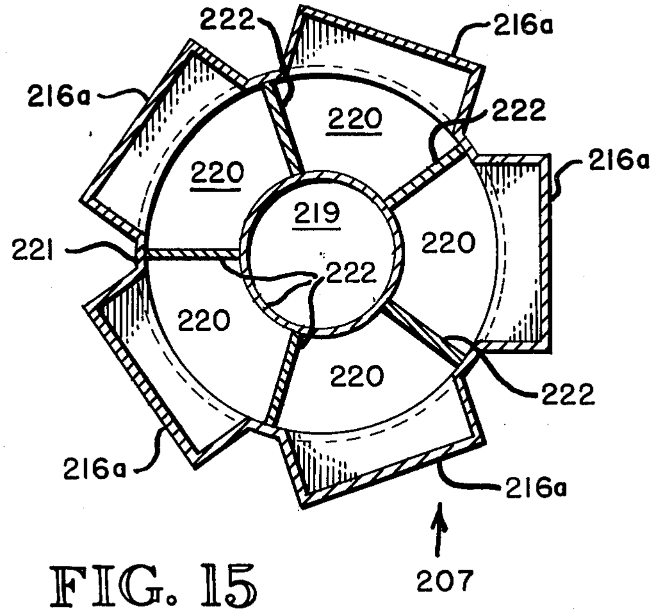
FIG. 15
FIG. 16
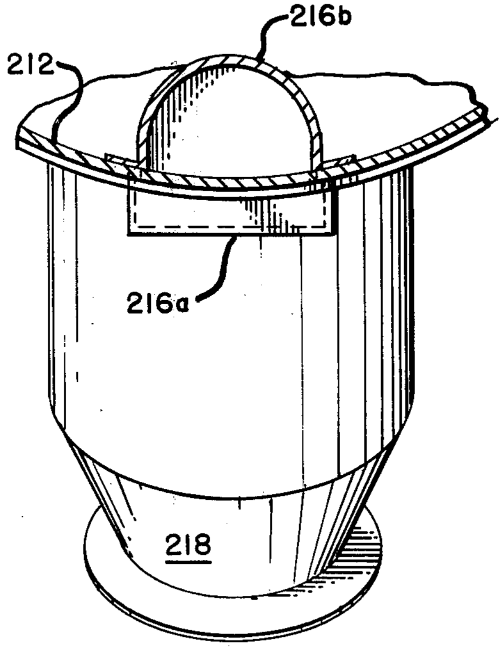

SYSTEM FOR CONTROLLING SEGREGATION WITHIN A BIN DURING MATERIAL WITHDRAWAL

This is a continuation of application Ser. No. 449,055 filed Mar. 7, 1974 abandoned, which is a continuation of application Ser. No. 354,173, filed Apr. 25, 1973 abandoned, which is a continuation-in-part of Ser. No. 254,883 filed May 19, 1972 abandoned.

This invention relates to solid particulate material storage bins and, more particularly, to the control of material segragation within a storage bin during withdrawal of material from the bin.

Solid particulate material bins can be categorized as process bins and storage bins. Process bins are employed in continuous or batch type processes and hold material, typically, for relatively short time periods during operation of the process. Storage bins are employed to hold material for relatively longer timer periods, and are not directly involved in a process other than to supply material to, or receive material from, the process. Storage bins, are usually considerably larger than process bins, often having a capacity measured in railcar loads.

Recent developments in process bin design, enabling the construction of laminar mass flow bins and the attainment of substantially first in—first out material flow through the bin, often are either too sophisticated and too expensive to justify application to storage bins, or incapable of being incorporated into existing storage bins. The present invention although suitable for application to process bins, does not provide material flow control that is as accurate as that provideably by these recent process bin design developments. Therefore, the present invention's principal utility is in storage bin design, both new bin design and existing bin conversion. Of course, if the design requirements of any particular process bin do not require or justify the application of these recent process bin design developments, utilization of the present invention will enable achievement of first in—first out material flow through the bin to a greater degree than heretofore has been possible by employing prior art bin design techniques.

The present invention is applicable to bins having hoppered bottoms, excepting so-called "live bin bottoms." "Live bin bottoms" consist of multiple hoppers, each having a single material discharge opening and relatively little height resulting in short hopper side walls. Preferred hoppered bottoms to which the present invention is applicable are provided with side walls of sufficient steepness to qualify as at least self-emptying. Typical self-emptying hoppered bottoms have single discharge openings. Bins for which the present invention is particularly suited are of a design that would cause solid particulate material to discharge by funneling.

In the practice of the present invention, a plurality of material discharge openings are provided at the bottom hopper of a bin and spouted to a blending device of a type to be described. The spouting may be outside the bin and extend through the bottom hopper wall, may be internal inside the bin and extend along the inner surface of the bottom hopper wall, may be both internal and external, or may be provided within or as a part of the bottom hopper wall. The multiple openings are positioned on the sloped bottom hopper surface as well as at the lowest natural point of material discharge from the hopper bottom.

FIGS. 1*a*–1*e* depict the operation of a prior art type bin having a single opening self-emptying hoppered bottom;

FIGS. 2*a*–2*e* comparatively depict the operation of the FIG. 1 type bin provided with additional discharge openings in the hopper side wall, all openings being spouted to a device of the type hereinafter described.

FIG. 3 depicts a slip-formed storage bin provided with a self-emptying conical hopper bottom provided with multiple spouted openings in accordance with the present invention;

FIG. 4 depicts a slip-formed storage bin provided with a co-planar hopper bottom provided with multiple spouted openings in accordance with the present invention;

FIG. 5 depicts a storage bin provided with a sand filled or grouted, single opening self-emptying conical bottom provided with internal spouting in accordance with the present invention;

FIG. 6 is a bin cross-section taken along the lines 6—6 of FIG. 3;

FIGS. 7 and 8 depict improved blender devices of the type particularly suited to the purposes of the present invention;

FIG. 10 is a plan view of a hoppered bin bottom provided with an eccentric outlet and multiple openings spouted to the outlet by spouting sections embedded in the hopper bottom;

FIG. 11 is an enlarged plan view of the eccentric outlet of the FIG. 10 hopper bottom;

FIG. 12 is a bin cross-section taken along the lines 12—12 of FIG. 11;

FIG. 13 is a plan view of a hoppered bin bottom provided with pre-fabricated unit having a central outlet and external spouting extending from an integral blending device;

FIG. 14 is a bin cross-section of the FIG. 13 hopper bottom taken along the line 14—14 of FIG. 13;

FIG. 15 is an enlarged plan view of the prefabricated unit of the FIG. 14 hopper bottom taken along the lines 15—15 of FIG. 14;

FIG. 16 is a detail cross-section taken along the lines 16—16 of FIG. 14;

Figures 1A, 1B, 1C, 1D, 1E, 2A, 2B, 2C, 2D, 2E:
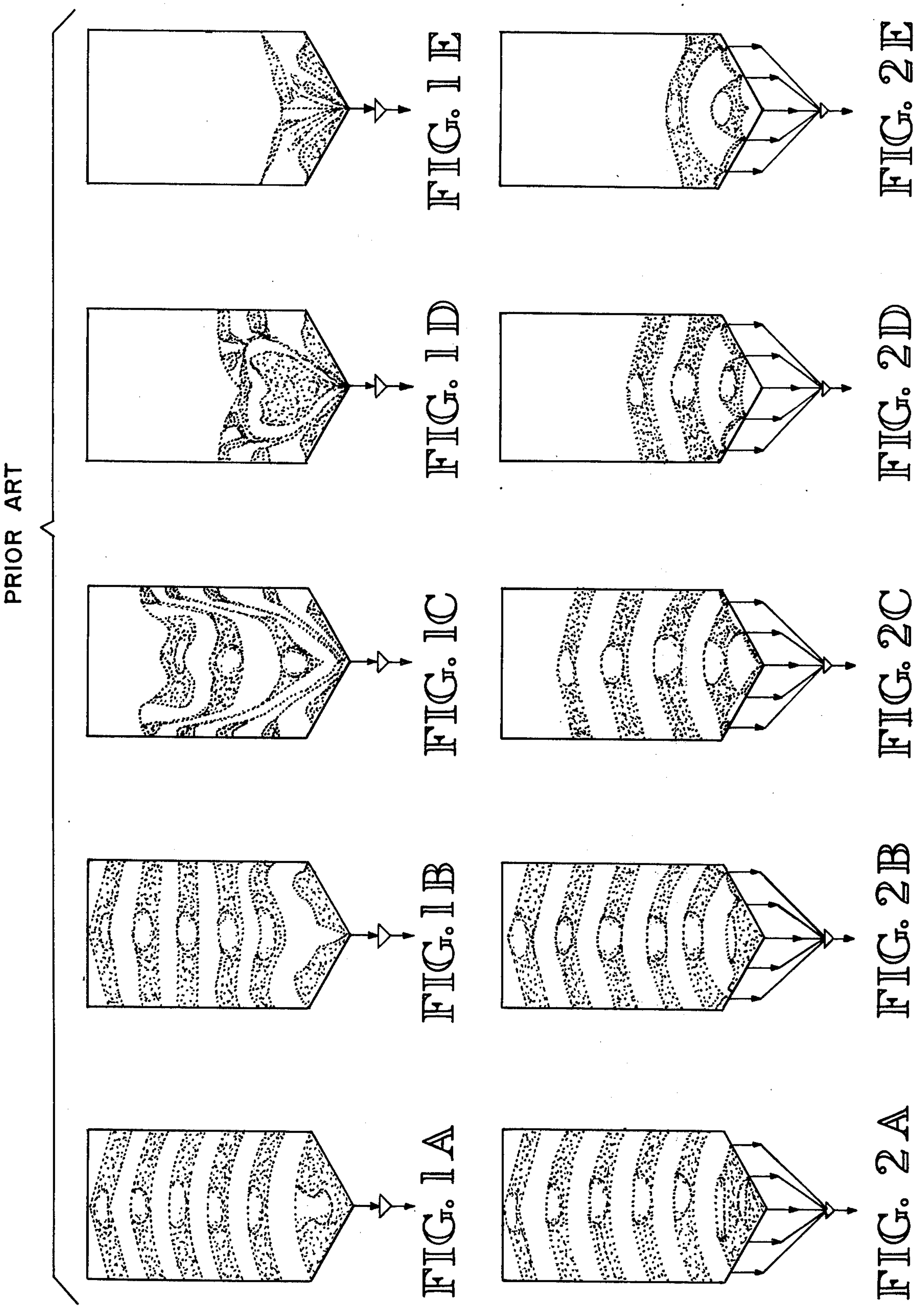

A comprison of FIGS. 1*a*–1*e* with FIGS. 2*a*–2*e* illustrates the marked improvement in bin flow characteristics achieved by the present invention. These figures are representations of material flow through identical rectangular storage volumes. FIG. 1*a* and 2*a* represent full bins filled from the top by centered spouts. FIGS. 1*b* and 2*b* represent bins which have just commenced discharge. FIGS. 1*c* and 2*c*, 1*d* and 2*d* and 1*e* and 2*e* represent bins at various stages of emptying, the respective sub-lettered figures representing substantially identical stages. The contained material is layered with alternate layers being stippled. Each layer is proportioned to the bin volume to represent the equivalent of a railcar load. The clear areas within the centers of the stippled layers represent fines. When storage bins are filled, for example from railcars, small particles will concentrate beneath the inlet spout and large particles will concentrate at the periphery, with the major portion of the more uniform material inbetween. In the case of grain, the large particles will include chaff and large free materials, the fine material will include sand, seeds and cracked grain.

In both FIGS. 1*a* and 2*a*, the railcar loads have assumed a chevron configuration within the bins, due to the angle of repose—a characteristic of all particulate material introduced into a volume under free fall conditions. Note in FIGS. 1*b*–1*e* the funneling of this bin, characterized by static zones of material along the bin wall and substantial downward material movement at the longitudinal center of the bin. Also note in FIGS. 1*b*–1*e* the segregation of material as this bin empties, characterized by preferential discharge of material at the longitudinal center of the bin to such an extent that in FIG. 1*e* (bin two thirds empty) little fine material remains and to such an extent that a large portion of large particled material remains. Further note in FIGS. 1*b*–1*e* the intermixing at discharge, of material from the various layers at different elevations in an uncontrolled manner, characterized by wide fluctuations in the relative proportions at discharge of material from the alternating layers as the layers traverse to the discharge opening.

The objects of the present invention are to substantially eliminate the above-noted bin flow and segregation characteristics.

Note in FIGS. 2*b*–2*e* that the bin has been converted to a substantially laminar mass flow bin. The alternate layers uniformly move downward through the bin within intermixing and without segregation until the material reaches the hopper bottom. As the material traverses downward within the hopper bottom and through the discharge openings, material flow becomes non-laminar. Because the discharge openings are at different elevations, the discharge openings receive material from as many as three different railcar layers as the material traverses downward within the hopper bottom. The intermixing that occurs is more uniform, without segregation and predictable. Consequently, the discharged material is substantially representative of the material introduced to the bin, having substantially the same proportions of large free materials and fines as when introduced.

In accordance with the present invention, the hopper bottom of a bin is provided with a plurality of discharge openings in the sloped hopper wall spouted to a blending device of the type to be described. The openings are located such that they draw from predetermined areas when projected to a plane perpendicular to the longitudinal axis of the bin. The segregated compartments within the blending device to which the discharge openings are spouted are similarly proportioned at the blending plane of the blending device to assure material withdrawal through each discharge opening in proportion to the projected areas served by each respective discharge opening.

A major feature of the present invention is that existing bins may be modified to accomplish the above-noted objects. If possible, an existing bin bottom can be modified by cutting additional openings through the hopper wall. If the bin bottom, however, is fabricated of sand or the like, spouting can be extended into the existing discharge opening and extended along the inner bottom wall surface to selected locations where their inner open ends provide the necessary discharge openings.

In brief, the blending device of this invention is of the type described in U.S. Pat. No. 3,575,321, and comprises outlet means providing a gravity discharge passageway for blended particulate solids having a certain minimum length, and blending means providing a plurality of segregated compartments extending into and terminating open ended with the gravity discharge passageway. Each stream of material to be blended is fed into one of the segregated compartments and the material therein passes through the compartment into the gravity discharge passageway. (The disclosure of U.S. Pat. No. 3,575,321 is incorporated herein by this reference as though that disclosure were herein full set forth.)

The flow rate through the discharge passageway must be less than the combined flow capacity into the segregated compartments. Thus under normal operating circumstances, the limiting flow rate through the discharge passageway will cause the segregated compartments of the blending means to be continuously full. Under operating conditions that keep the compartments filled, it has been discovered that particles in a cross-sectional layer across the vertical discharge passageway will flow uniformly downward therethrough (under influence of gravity) regardless of the parameters existing upstream of the discharge passageway, provided that the discharge passageway is at least a certain length. This being the case, material can only be fed into the blending device of this invention at the rate at which it flows through the discharge passageway. Thus, any tendency of one of a plurality of discharge streams from the bottom of a single bin to feed more rapidly than another, for example, is eliminated. Consequently, the uniform blending of a plurality of discharge streams from a single bin can be achieved by dividing the segregated compartment outlets into equal cross-sectional area. And, more broadly, a desired blending of a plurality of streams of particulate solid material can be achieved by dividing the segregated compartment outlets into cross-sectional areas proportional to blend. The overall result, therefore, is that equipment dimensions upstream of the entry section of the discharge passageway (i.e. upstream of that section of the passageway that contains the segregated compartment outlets) need not be matched with exactitude to ensure the desired blending.

The length of the discharge passageway is critical to the extent that for any given discharge passageway and its cross-sectional area; there will exist a point above the outlet thereto where the particles across the passageway will not fall uniformly downward. Therefore, the passageway must be sufficiently long that the distance from the passageway outlet to the segregated compartment outlets will be greater than the distance from the passageway outlet to that point of non-uniform flow. If this condition is met, the particles will descend from the segregated compartment outlets uniformly thereby forming a blend equal to the relative cross-sectional areas of the segregated compartment outlets.

It is to be emphasized that the mechanism by which the flow rate through the discharge passageway is restricted relative to the combined input flow capacity to the segregated compartments inherently will be controlling at an elevation below this critical point inasmuch as it is the existence of this mechanism that creates the critical point. And, the configuration of this mechanism will affect the elevation at which this critical point is created. It is also to be emphasized that the cross-sectional geometry of the discharge passageway is not critical so long as the geometry is uniform down to an elevation below the critical point. And, in fact, a change in the cross-sectional geometry below the discharge passageway may be employed to create the mechanism to impart flow rate limitation above.

The length of the entry section of the discharge tube is critical only to the extent that it must be sufficiently long to enable the solid material to enter the entry section under turbulent conditions, undergo a transition to substantially laminar flow, and exit the entry section under laminar flow conditions. For practical purposes, the outlet to the entry section should be above the aforementioned critical point. In the expected case, the solid particulate material would enter the discharge tube entry section in a plurality of streams, each being fed from a continuously replenished overhead body of segregated material within the main section of the blender means of large cross-sectional area, and thus the material will not enter the entry section under laminar flow conditions. However, by being confined in segregated streams, each of uniform cross section longitudinally (as occurs in the entry section), the material within each stream will assume laminar flow conditions within a very short distance. Upon reaching laminar flow conditions, the multiple streams can be recombined without material transfer from one stream to another by termination of the divider plates (delineating the exit to the discharge passageway inlet section).

Multiple rate-controlled devices, such as orifices, powered-feeders, or "merchen" powerless feeders, could be employed as an alternate to blending devices of the type herein described, to volumetrically blend the separate streams into a common stream. Accuracy and economy would be sacrificed; however, by such a substitution.

FIGS. 3 and 4 depict two common types of slip-formed concrete storage bins. The cylindrical wall 10 of each is cast by slip-forming from a base foundation. In FIG. 3, the hopper bottom 12 is depicted as a conical center opening metal hopper. In FIG. 4, the hopper bottom 10 is depicted as a sloped co-planar concrete slab. As shown in FIG. 6, a plurality of openings 14 are provided through the hopper 12 and spouted, by spouting 16, to a blending device 18 of the type described above. In existing slip-formed storage bins, the hopper bottoms are usually elevated so that the required spouting and blending device may be located below and within the confines of the slip-formed walls.

FIG. 5 depicts a storage bin having a hopper bottom 12 formed by sand fill, grouting or the like to provide a center opening conical hopper. Spouting 16 is extended through the center hopper opening 14, run along the inner hopper surface and open ended at selected locations. Insofar as material discharge is concerned, the result of extending spouting along the hopper inner surface is identical to cutting discharge openings through the hopper wall. The spouting may be anchored to the hopper inner surface. The spouting inner ends are preferably designed to open upward thereby facillitating entry of material into the spouting.

The intermixing of adjacent layers during discharge can be affected by the location of the discharge openings. For example, in FIG. 6 three discharge zones are defined: the first being the area served by the center opening; the second being the area served by the intermediate ring of eight openings; and the third being the area served by the outer ring of 12 openings. As material layers enter the hopper, they will be initially drawn off through 12 of the openings while layers further down in the hopper will be drawn off by the remaining nine openings, thereby maximizing the withdrawal of material in one layer relative to another. By providing only eight openings in the outer ring, a greater degree of proportionality can occur. Furthermore, the area served by the openings can be affected by their relative positions, for example by positioning the openings closer or further from the bin side wall, the degree to which the outer ring of openings can draw from two adjacent layers can be affected. Thus, by appropriate design, the intermixing of adjacent layers during discharge can be controlled, without affecting the ability to convert an otherwise funneling bin to a substantially laminar, mass flow, segregation free bin.

To enhance controlled intermixing of adjacent layers, for example of adjacent railcar loads, in a bin having a sloped co-planar hopper bottom as shown in FIG. 4, the bin inlet could be positioned above the hopper lower end as shown. Thus, layers of material would assume the configuration shown by the diagonal lining within the bin 10. Consequently, as material is withdrawn from the bin, several layers would be exposed to bin discharge openings simultaneously.

FIGS. 10, 11 and 12 depict a preferred application of the present invention to a circular bin having a self-emptying, filled bottom hopper with an eccentric outlet. The hopper bottom wall 122 is eccentrically concave and contains an eccentric outlet 114 within which a blending device of 118 is fitted. A plurality of spouting sections 116 are preferably embedded in the hopper bottom wall and fan upward and outward from blending device 118 to inlet openings 119. One inlet is centered and the remaining shown as four (in number) are located at about the midpoints of the legs of an inscribed pentagon (shown in dotted line in FIG. 10) with apexes located on the bin periphery midway between the inlets 119. Emperically, the provision of a center inlet and five peripheral inlets located at about the pentagonal leg midpoints optimizes the laminar flow characteristics of a bin having a single opening, hoppered bottom if each peripheral inlet contributes about 15% of the material discharged and the central inlet contributes about 25% of the material discharged. (In modifying existing bin structures, the outlet 114, of course, must be utilized wherever located, but in new construction the outlet 114 is also preferably located near pentagonal leg midpoint). Therefore, the divider plates 122 subdivide the entry section of the discharge passageway 121 such that each of the compartments 120 fed by the peripheral inlets represent about 15% of the total discharge passageway cross-sectional area, and such that the compartment fed by the central inlet represents about 25% of the total discharge passageway cross-sectional area. The depicted rectangular configuration of the segregated compartments inlet (e.g. as shown in FIG. 11) greatly simplifies the connection of the spouting 116 into their respective segregated compartments.

FIGS. 13, 14, 15 and 16 depict a preferred application of the present invention to a hung hopper bin. This embodiment is applicable to both metal and concrete bins having a center outlet and is shown applied to a conical hopper bottom. The hopper bottom is cut away at a point 205 to provide an opening having a suitable span. Commonly, metal bins are provided with openings having a span of 1 foot, 2½ feet or 5 feet, and the unit 207 may be fabricated to accommodate any of these spans, or any other span desired. A prefabricated unit 207 is provided to be attached to the hopper bottom, as by bolting, welding, or riveting that includes a blending device 218, a frusto-conical hopper section 229 and a plurality of external radiating spouting sections 216*a*.

The segregated compartments 220 of the blending device are arranged as one axial compartment constituting about 25% of the total cross-sectional area of the discharge passageway 221 at the blending plane and five peripheral compartments each constituting about 15% of the total cross-sectional area of the discharge passageway at the blending plane. The axial compartment opens upward to provide a central inlet 219 and each peripheral compartment opens to a peripheral inlet 219 through a radial spouting section 216*a*.

Before the unit 207 is secured in place to the hopper bottom 212, the spouting sections 216*b* are secured to the inner surface of the hopper bottom 212 to provide five peripheral inlets 219 located at about the pentagonal leg midpoints (similarly to the inlet locations of FIG. 10). When the unit 207 is installed, each spouting section 216*b* empties into a spouting section 216*a* through an aperture 215 provided in the frusto conical hopper section 229.

Figure 17:
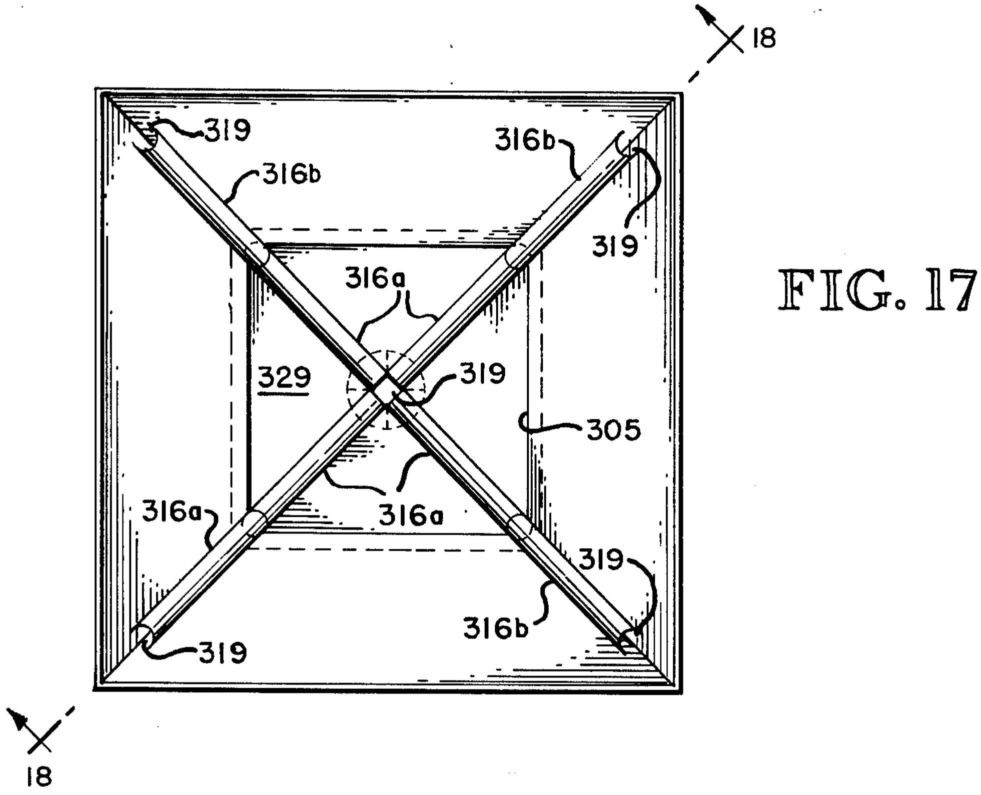
FIG. 17 is a plan view of another hoppered bin bottom provided with a pre-fabricated unit having a central outlet and spouting extending from an integral blending device.
Figure 18:
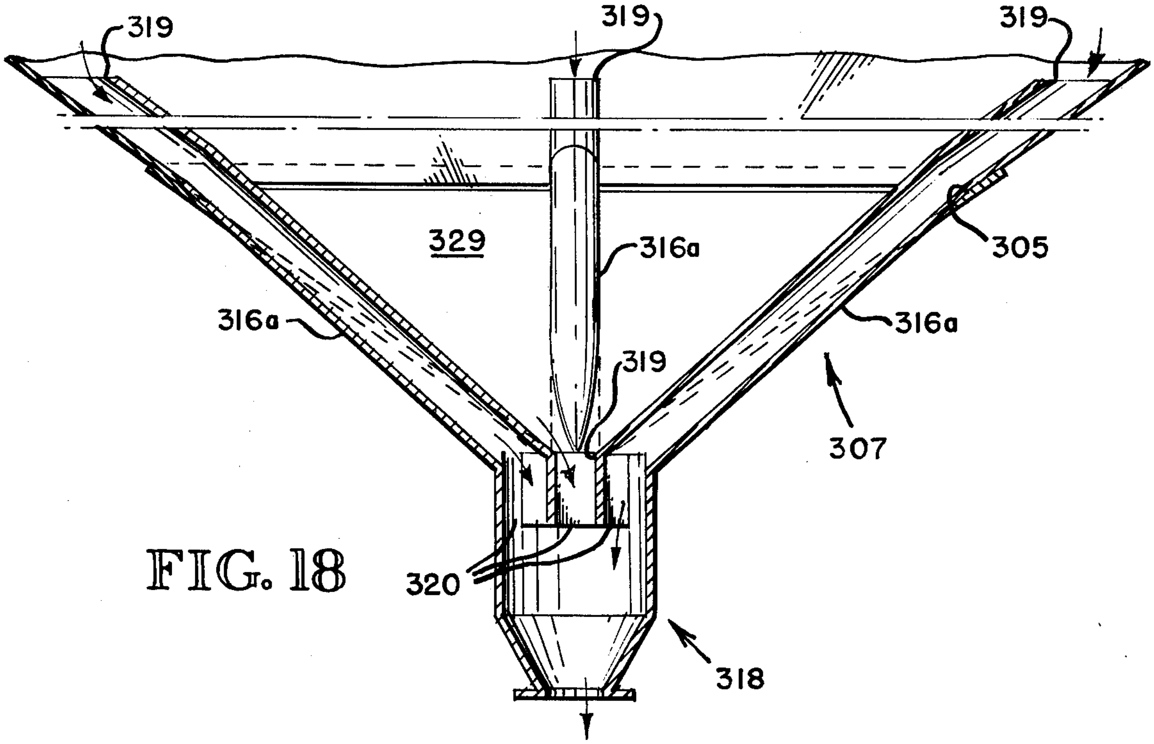
FIG. 18 is a cross-section of the FIG. 17 hopper bottom taken along the lines 18—18 of FIG. 17.

FIGS. 17 and 18 depict another preferred application of the present invention to a hung hopper bin. This embodiment is applicable to both metal and concrete bins having a center outlet and is shown applied to a pyrimidal hopper bottom. The hopper bottom is cut away at a point 305 to provide an opening having a suitable span. A pre-fabricated unit 307 is provided to be attached to the hopper bottom, as by welding that includes a blending device 318, a pyrimidal hopper section 329 and a plurality of radiating spouting sections 316*a*. The spouting sections 316*a* commence at their upper ends as internal sections and transform to external sections at their terminus adjacent the blending device 318.

The segregated compartments 320 of the blending device are arranged as one axial compartment constituting about 31% of the total cross-sectional area of the discharge passageway 221 at the blending plane, and four peripheral compartments each constituting about 17.25% of the total cross-sectional area of the discharge passageway at the blending plane. The axial compartment opens upward to a central inlet 319 and each peripheral compartment opens to a peripheral inlet 319 through a radial spouting section 316*b*.

After unit 307 is secured in place to the hopper bottom 312, the spouting sections 316*b* are secured to the inner surface of the hopper bottom 312 to provide the four peripheral inlets 319. When the unit 307 is installed, each spouting section 316*b* connects to a spouting section 316*a*.

The number of discharge openings required is a matter of optimization. The number shown in FIGS. 10 et seq. provide an economical balance of cost vs. efficiency. The provision of more discharge openings will increase efficiency from the standpoint that segregation free flow will exist further down into the hoppered bottom than would be the case with fewere discharge openings.

FIG. 7 depicts a preferred blending device configuration. The segregated compartments 20 are provided by divider plates 22 mounted by a center shaft 24. The lower end of shaft 24 terminates, below the critical point of the discharge passageway 21, in a taper that is steeper than the angle of repose of the material to be passed through the device, peferably at least 55° to 60°.

The major feature in the FIG. 7 device is the provision of a mass flow hopper 26 below the critical point of the device. To constitute a mass flow hopper, the hopper side walls must be sufficiently steep that all particles within the hopper 26 will move during flow through the blending device. This permits fabricating the device with an overall length that is less than that required if the discharge passageway were straight sided below the critical point.

Figure 8:
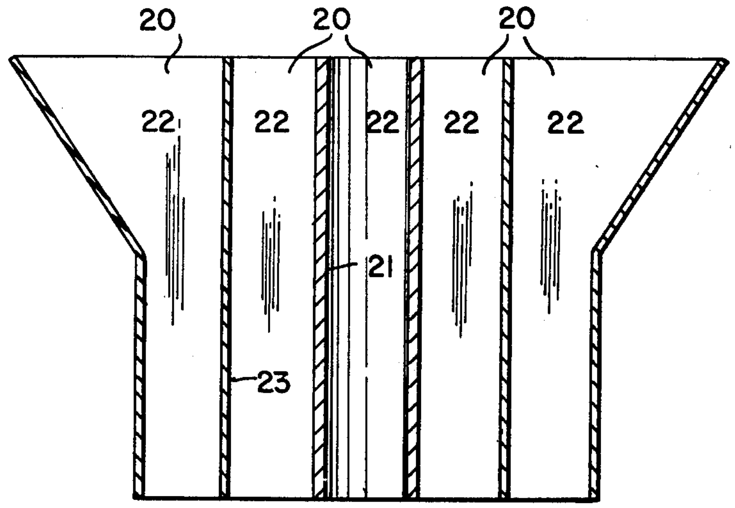
Figure 9:
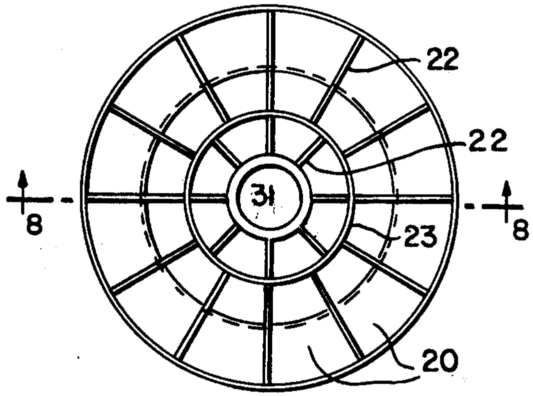
FIG. 9 is a top plan view of the FIG. 8 embodiment.

FIGS. 8 and 9 depict another blending device designated to be served by relatively large number of spouts, as may be desireable for application to storage bins. This device, as depicted, accommodates 21 segregated compartments 20 provided by two concentric tubes 21, 23 and intervening divider plates 22.

Figures 19, 20, 21:
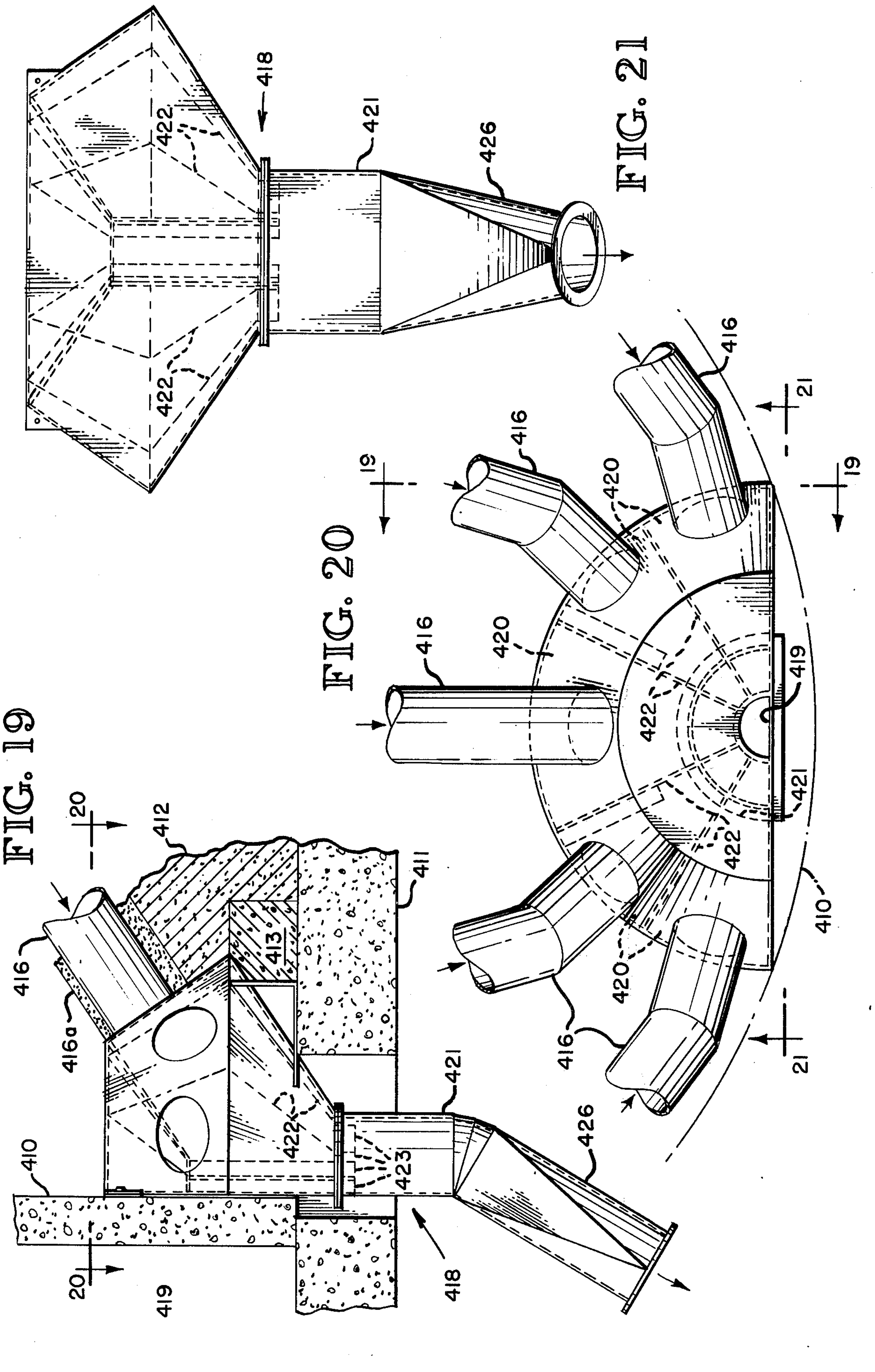
FIG. 19 is a side elevation view of an alternate blender suitable for use in bins of the FIG. 10 type.
FIG. 20 is a top plan view taken along the lines 20—20 of FIG. 19.
FIG. 21 is another elevation view taken along the lines 21–20 of FIG. 20.

FIGS. 19–21 illustrate another blending device configuration 418 specially suited for a concrete, slip-formed bin provided with a sand-filled, perimeter-dicharging hopper bottom of the FIG. 10 type. In plan, the device is semi-circular with segregated compartments 420 provided by radial divider plates 422. This device could be prefabricated, positioned as shown within the bin before formation of the hopper bottom, and secured in place against the bin wall 410 and the bin base 411 by an encircling concrete ring 413. The sand-filled hopper bottom 412 is then formed as shown, spouting 416 installed, and grouted into position, the grout surface 416*a* providing a hard, smooth hopper bottom surface leading downward to the peripheral inlet opening 419. The space between the back of the blending device and the bin wall would be filled with grout.

Although the peripheral inlet opening provided by the blending device does not lie on the pentagonal midpoint, as previously described, the loss of efficiency is acceptably small in consideration of the ease of bin hopper bottom construction and blending device prefabrication permitted thereby. The discharge passageway 421 extends through an opening provided therefor in base wall 411, and is tapered as shown to provide a mass flow hopper section 426.

The conduit providing the discharge passageway 421 may include thin, relatively flexible divider members 423 designed to abut the lower edges of divider plates 422. This feature would permit fabricating the embedded section of the blending device out of material of sufficient strength to withstand compaction forces as the sand-filled bin bottom is formed. An yet the relative cros sectional areas at the lower terminus of the segregated compartments 420 where they open into the discharge passageway, 421 can be altered as needed by adjusting members 423.

The embodiment of the invention in which an exclusive property is claimed are defined as follows:

1. A method of converting a particulate material bin, the bin having a sloped bottom surface defining a hopper with a single discharge opening which would effect funnel flow conditions within the bin upon withdrawal of particulate material therethrough, into a substantially laminar mass flow bin wherein particulate material travel through the bin into the hopper is effected in a substantially first in—first out segregation free manner, which method comprises providing means including a plurality of material discharge spouts for controlling downward flow of particulate material through the bin, each spout opening solely to the hopper at a selected location adjacent the sloped bottom surface to draw material from substantially one predetermined portion of a horizontal cross sectional plane in the bin, providing a material blending device in communication with said discharge spouts for receiving a stream of material from each of said selected locations and blending the streams into a common stream, said blending device including means providing a discharge passageway having an entry section, and means including a plurality of divider members for controlling downward flow of material through said discharge passageway by dividing said entry section into a plurality of segregated open-ended compartments (1) in communication with respective spouts and (2) of lengths sufficient to obtain continuous uniform movement of the discharge streams without cross flow therebetween adjacent the downstream terminus of said compartments, the horizontal cross sectional areas of said compartments respectively corresponding proportionally to the areas of the portions of the bin cross sectional plane from which the material in each stream is drawn to effect substantially first in—first out segregation free flow of material downwardly through the bin into the hopper with substantially uniform common stream composition.

2. The method of claim 1 wherein sid providing material discharge spouts step comprises the additional step of extending the discharge spouts through the bottom surface into communication with the bin interior at said selected locations.

3. The method of claim 1 wherein said providing material discharge spouts step comprises the additional step of extending the discharge spouts through an existing discharge opening in the bottom surface and into communication with the bin interior at said selected locations.

4. A bin comprising a bottom surface defining a hopper which would provide the bin with a funnel flow characteristic when material is dicharged through a single discharge opening in the hopper, characterized by means including a plurality of material discharge spouts for controlling downward flow of particulate material through the bin, each spout opening solely to the hopper at a selected location adjacent the sloped bottom surface thereof to draw material from substantially one predetermined portion of a horizontal cross sectional plane in the bin, a material blending device in communication with said spouts for receiving a stream of material from each of said locations and combining the streams into a common stream, said blending device including means providing a discharge passageway having an entry section, and means including a plurality of divider members for controlling downward flow of material through said discharge passageway by dividing said entry section into a plurality of segregated open-ended compartments (1) in communication with respective spouts and (2) of lengths sufficient to obtain continuous uniform movement of the discharge streams without cross flow therebetween adjacent the downstream terminus of said compartments, the horizontal cross sectional areas of said compartments respectively corresponding proportionally to the areas of the portions of the bin cross sectional plane from which the material in each stream is drawn to effect substantially first in—first out segregation free flow of material downwardly through the bin into the hopper with substantially uniform common stream composition.

5. The bin of claim 4 wherein said spouts are extended through the bottom surface into communication with the bin interior at said selected locations.

6. The bin of claim 4 wherein the discharge spouts are extended through a discharge opening in the bottom surface and into communication with the bin interior at said selected locations.

7. The bin of claim 4 wherein one of said openings is located adjacent the lowest natural point of material discharge from the hopper, and said blending device is secured to the bottom surface in direct communication with the one discharge opening, and wherein said material discharge spouts extend from said blending device into the interior of said bin for transfer of material from the remaining openings to said blending device for discharge from said device in a single stream.

8. The bin of claim 7 wherein said blending device and lower sections of said spouting are integral with the bottom surface, and wherein the upper sections of said spouting are secured to the bottom surface.

9. Apparatus for joining a number of streams of particulate material to form a resultant joint stream which comprises means for providing a discharge passageway; blending means for introducing segregated streams of particulate material into the discharge passageway and combining the streams into a common stream in the passageway at a point of combination at the terminus of stream segregation; said passageway having an elongated section of at least a minimum length and of substantially uniform cross sectional area commencing at said point of combination and extending downstream from said point of combination; and means downstream of said elongated section for restricting flow through said elongated section to a rate less than the combined maximum flow rates of the segregated streams to obtain a uniform movement of cross-sectional segments of said solids at said point of combination, said minimum length being greater than the distance between said restricting means and a critical point upstream at which particle flow begins to be non-uniform across the elongated section, and said restricting means being comprised of a mass flow restriction through which said common stream discharges from said passageway, said mass flow restriction consisting of a tapered section in communication with said elongated section and having a cross sectional area which progressively decreases from the cross sectional area of said elongated section in the direction of particle flow.

10. The apparatus of claim 9 wherein said blending means comprises a plurality of separate enclosed compartments, one such compartment for each segregated stream, which discharge into said discharge passageway at said point of combination.

11. The apparatus of claim 10 wherein one of said compartments is open at its upper end for receipt of material and wherein the other compartments open to spouting for receipt of material from the spouting.

12. The apparatus of claim 10 wherein said compartments are separated from one another by divider members which extend into an upper entry section of said discharge passageway to said point of combination.

13. The apparatus of claim 9 wherein said blending means comprises an upper section tapering downward and inward to an opening into said discharge passageway above said point of combination, and spouting communicating with said discharge passageway above said point of combination and arranged to transfer streams of particulate material to said discharge passageway separated from one another and from particulate material transferred to said opening.

14. The apparatus of claim 13 wherein an upper entry section of said discharge passageway is divided into compartments by divider members extending outwardly from a tube, each said compartment being in communication with one of said separate streams and said tube being in communication with said opening.

15. The method of claim 1 wherein said providing a material blending device step comprises the additional steps of first cutting away a portion of the bin bottom, then securing said material blending device to the bin bottom in underlying relation to the cut away portion thereof, said material blending device communicating directly with said one opening and communicating with the remainder of said openings via spouting.

16. A system for withdrawing particulate material from a bin, having a hoppered bottom, comprising: means including a plurality of openings for controlling downward flow of particulate material through the bin, said openings each being located solely in the bin bottom at a location selected to draw particulate material from substantially one predetermined portion of a horizonal bin cross sectional plane; and blending means in communication with said openings for combining the discharge streams into a common stream, said blending means including means providing a discharge passageway having an entry section, and mens including a plurality of divider members for controlling downward flow of material through said discharge passageway by dividing said entry section into a plurality of segregated open-ended compartments (1) in communication with respective openings and (2) of lengths sufficient to obtain continuous uniform movement of the discharge streams without cross flow therebetween adjacent the downstream terminus of said compartments, the horizontal cross sectional areas of said compartments respectively corresponding proportionally to the areas of the portions of said horizontal bin cross sectional plane from which the streams are respectively drawn, whereby the composition of the common stream is substantially uniform.

17. The system of claim 16, wherein one of said openings is located adjacent the lowest natural point of material discharge from the bin bottom and is adapted to contribute more material for discharge than each of the remaining openings.

18. The system of claim 17, wherein said one opening coincides with the longitudinal axis of the bin.

19. The system of claim 17, wherein said one opening is eccentric with the longitudinal axis of the bin.

20. The system of claim 16, wherein said blending means further include a mass flow restriction downstream of said passages.

21. A method of withdrawing particulate material from a bin having a hoppered bottom, comprising the steps of:

controlling downward flow of particulate material through the bin by withdrawing particulate material from the bin at a plurality of points located solely in the bin bottom to form a plurality of discharge streams drawn from respective portions of a horizontal bin cross sectional plane;

combining the discharge streams into a composite output stream under uniform flow conditions without cross flow therebetween in proportion to the areas of said bin cross sectional plane from which they are respectively drawn, whereby the composition of the output stream is substantially uniform.

22. The method of claim 21, wherein said withdrawing step includes the additional step of withdrawing particulate material from the lowest natural point of material discharge from the bin bottom at a rate greater than the rate of withdrawal at each of the remaining points.

23. The apparatus of claim 9, wherein said mass flow restriction is symmetric with respect to the direction of particle flow therethrough.

* * * * *